Patented Dec. 15, 1925.

1,565,595

UNITED STATES PATENT OFFICE.

WALTER O. SNELLING, OF ALLENTOWN, PENNSYLVANIA.

CURRENT-RECTIFYING DEVICE.

No Drawing.      Application filed February 28, 1923. Serial No. 621,945.

*To all whom it may concern:*

Be it known that I, WALTER O. SNELLING, a citizen of the United States, residing at Allentown, in the county of Lehigh and State of Pennsylvania, have invented certain Improvements in Current-Rectifying Devices, of which the following is a specification.

My invention relates to current rectifying devices of the general nature of natural crystal detectors, and more particularly relates to improvements in contact rectifiers, electric valves, contact detectors and like devices having the property of detecting electromagnetic waves, and of modifying the currents set up by ether waves or other radiant energy.

It has long been known that the electrical conductivity of certain natural minerals varies with the direction in which the electrical current passes through the mineral, and with the intensity and duration of the applied electro-motive force. This property has been referred to as "uni-directional" conductivity, but may be more properly called selective conductivity or valve action, since in many cases the selective action made use of in the detection of radiant energy is not the directional factor at all, but is rather the variation in response of the contact element to changes in the duration or the intensity of the applied electrical pressure.

The fact that many natural minerals show selective electrical conductivity has caused efforts to be made to prepare synthetic products having the same effect. On preparing the corresponding sulfides, selenides, tellurides and arsenides of metals known to possess current rectifying properties as the naturally occuring crystals, by fusing together the metal and the non-metallic component, products have been obtained which possess fair rectifying properties. It is known, for example, that by melting together a mixture of lead and sulfur to form lead sulfide, the fusion mass obtained possesses current rectifying properties which are approximately equal to the current rectifying properties of natural galena.

Efforts to make other synthetic current rectifying products have not been equally successful however, and in general it has been found that the products obtained by fusing together the components of natural minerals in the proportions in which the components exist in the natural minerals, do not yield products having satisfactory current rectifying characteristics, although such products frequently show slight current rectifying ability.

I have discovered that products having improved current rectifying characteristics may be obtained if, instead of fusing together a metal and an element of the sulfur group, a reaction is brought about between a suitable metal and the vapor of an element of the sulfur group.

As an example of this aspect of my invention, I will describe a method which I may employ in the preparation of a current rectifying product by the vapor phase reaction between copper and sulfur. I first place metallic copper, preferably in the form of a sheet about .8 mm. in thickness, in a suitable vessel, and heat to dull redness. If the vessel contains air some superficial oxidation of the copper will occur, but this will do no harm, and under certain conditions is advantageous. Upon now admitting the vapor of sulfur to the vessel a vigorous reaction will go on with increase in temperature. I preferably admit my sulfur vapor at such a rate that the reaction will at all times be under control and the temperature of the copper will not exceed medium redness. Under these circumstances neither the copper nor the copper sulfide melt, but a reaction occurs between the vaporous sulfur and the solid copper, with the production of a sheet of copper sulfide having the same general form as the sheet of copper used, although a slight change in dimensions occurs as the result of an expansion in volume due to the reaction. The resulting product has unique characteristics as a current rectifying element. Although not sufficiently sensitive to very rapid changes in electro-motive force to be used to advantage as a contact detector for radio waves of relatively short length, the copper sulfide product made as described forms an extremely efficient rectifier of alternating currents of low frequency, and may be employed in many types of apparatus for the modification of the current flow resulting from changes in the direction or the intensity of an applied electro-motive force.

The contact rectifying element made by the reaction of sulfur in the vapor phase on metallic copper in solid condition permits current to flow readily from an electrode making firm contact with the rectifying element toward an electrode making light contact with the rectifying element, but permits practically no current to flow in the reverse direction. Accordingly, when a disc of my new current rectifying product forms part of a circuit which is coupled inductively to a circuit carrying an alternating current of low frequency, and one electrode in contact with my rectifying element is held firmly against the rectifying element, while the second electrode rests lightly upon the surface of the rectifying element, current flows through the rectifying element from the electrode making firm contact to the electrode making light contact, while current flow in the opposite direction is shut off by the valve-action of the rectifying element. Instead of employing two electrodes, one of which is in firm contact and the other in loose contact with the surface of my rectifying element, I may employ two electrodes of unequal surface area, in this case current tending to flow through the rectifying element from the electrode of large surface area to the electrode of small surface area. I find one desirable means of employing such a contact element as described is to firmly unite a disk of the contact rectifying element to one electrode using both firm contact and a large area of contact, while as a second electrode I employ only loose contact and small area of contact. Under these circumstances I find that tablets of copper sulfide made as above described show extremely low resistance to current flow in the direction from the electrode of large area and firm contact, toward the electrode of small area and loose contact, while in the reverse direction the resistance to current flow is very high.

Although in the illustration given I have referred to the use of copper as my metal element and to sulfur in vaporous condition as my active non-metallic agent, my invention is by no means limited to the use of these two materials, and I find that a considerable number of other metals and non-metals will undergo a vapor phase reaction with the production of contact rectifying elements of desirable properties. In general, the rectifying elements produced are much more responsive to electrical oscillations of some frequencies than to electrical oscillations of other frequencies, and by the selection of suitable metal elements and non-metal elements, contact rectifying products having a wide range of frequency response may be obtained. I find that compounds which have low electrical resistance after being fused tend to give products when made in unfused condition by my vapor phase treatment that are particularly responsive to electrical oscillations of low frequency, and are much less responsive to electrical oscillations of higher frequency, while compounds which have high electrical resistance after fusion as usually made are more responsive to electrical oscillations of high frequency when made in unfused condition by the vapor phase reaction between a metal and the vapor of an element of the sulfur group.

In treating metals such as lead whose fusion point is lower than the fusion point of the compound formed in the vapor phase reaction, it is of advantage to expose the fused metal to the vaporous reagent in a shallow layer, the temperature being maintained below the fusion point of the compound formed.

The essential feature of my invention is the production of products having desirable current rectifying characteristics by the reaction between a metal and an element of the sulfur group in vaporous condition at a temperature lower than the fusing point of such products. I find it of advantage to heat the metal which is used to the temperature necessary to start reaction with the non-metallic reagent, and while so heated to contact the metal with the vaporous reagent while maintaining the temperature of reaction below the fusion point of the compound formed. In controlling the reaction so as to keep the temperature below the fusion point of the compound formed, I may restrict the amount of vaporous reagent brought in contact with the heated metal, or I may reduce the partial pressure of the vaporized reagent by diluting the vaporized material with an inert diluent such as nitrogen, or I may cool my reaction vessel by a strong blast of air or other cooling agent. In general I find that I obtain the most satisfactory results by restricting the amount of vaporized reagent which is brought in contact with my heated metal, so as to maintain within my reaction chamber a temperature lower than the fusion point of the compound which is formed, the temperature within the reaction chamber being readily known at all times by means of a suitably protected thermocouple which is kept close to the metal being treated. It will be evident that by keeping the temperature within the reaction chamber below the fusion point of the compound being formed, none of the compound formed will be fused, and accordingly the resulting product will be an unfused mass, preserving closely the form, size and shape of the piece of metal used.

Instead of employing a single metal I may of course employ an alloy, and instead of employing a single element of the sulfur group I may employ a plurality of such elements, both of these steps leading to the production of current rectifying products of modified characteristics, as already described and claimed in my pending application S. N. 621,112. My present invention does not depend upon the nature of the metal or alloy which is used as the metallic component of a compound for rectifying purposes, nor on the nature of the element used to combine with such metal or alloy, however, but relates specifically to the production of contact rectifying elements by the bringing about of a reaction between a solid metal and a vaporized element of the sulfur group at a temperature lower than the fusion point of the compound formed.

It has already been mentioned in this application that the presence of a small amount of air in the reaction vessel does not unfavorably affect the compounds made in accordance with my present invention. In the event that a certain amount of air or oxygen is present, this tends to form a film of oxide over the metal, and this film of oxide is no doubt at least partly reduced by the non-metallic element under the conditions of temperature existing within the reaction vessel, but as I have specifically claimed the production of current rectifying products by the reduction of a metal oxide by an element of the sulfur group in my pending application S. N. 615,160, I do not claim such reaction as any part of my present invention, as I find that even in the absence of oxygen the reaction between metals and elements of the sulfur group at a temperature under the fusion point of the compound formed yields products having current rectifying characteristics.

It will be evident that many changes may be made, without departing from the spirit of my invention as herein disclosed. Although I have referred to the use of certain specific materials I do not wish to be limited to the use of such materials, as my invention is broadly applicable to the preparation of contact rectifying products of many different compositions, and no limitations should be implied, except such as are indicated in the appended claim.

I claim:

In the preparation of contact rectifying products the process which comprises contacting a metal with the vapor of an element of the sulfur group at a temperature above the reaction temperature of the two materials, but below the temperature of fusion of the reaction product formed.

In testimony whereof, I have hereunto subscribed my name this 26th day of February, 1923.

WALTER O. SNELLING.